Figure 4:
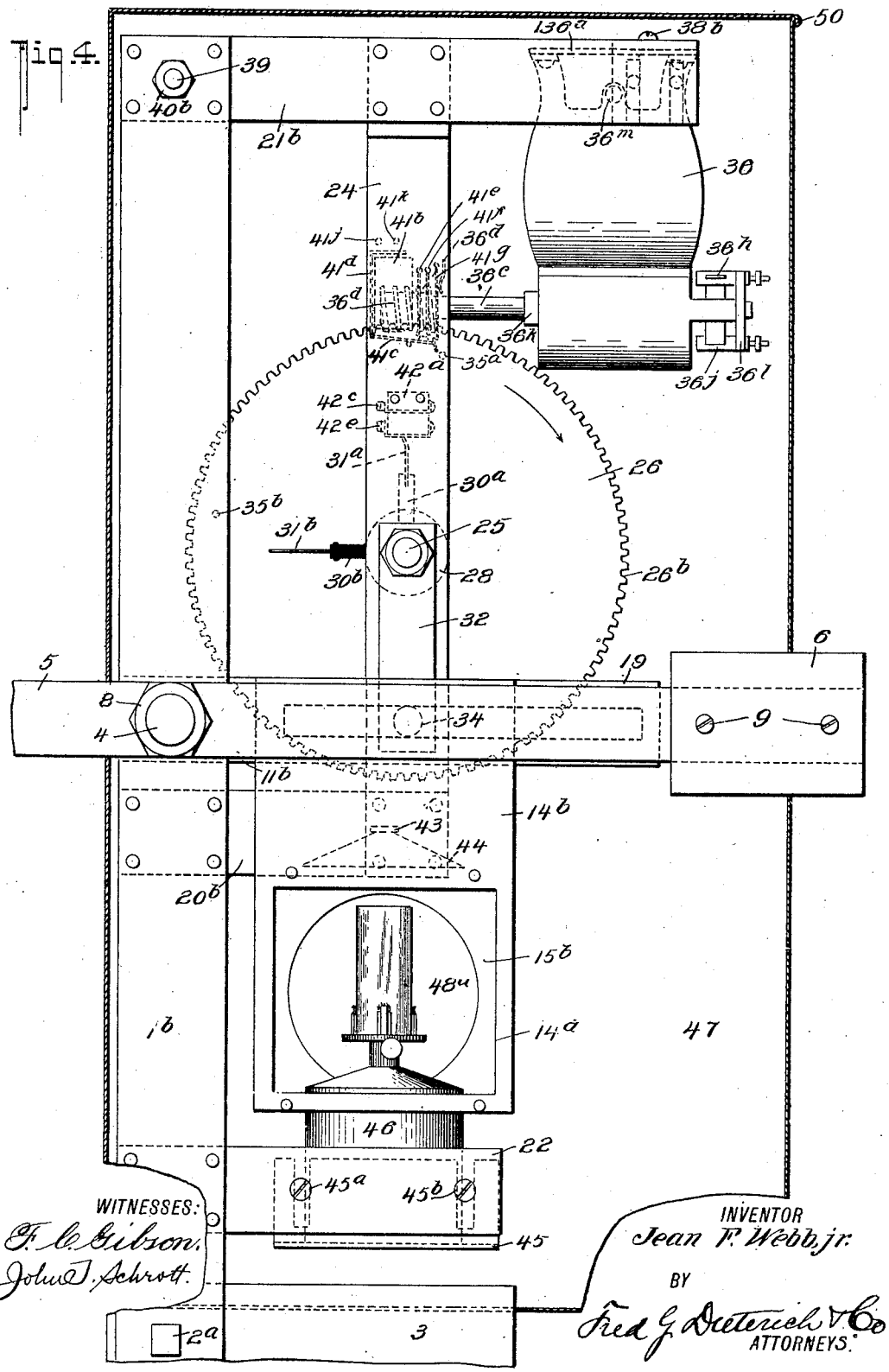

No. 830,629. PATENTED SEPT. 11, 1906.
J. F. WEBB, Jr.
SEMAPHORE.
APPLICATION FILED NOV. 11, 1905.
8 SHEETS—SHEET 1.
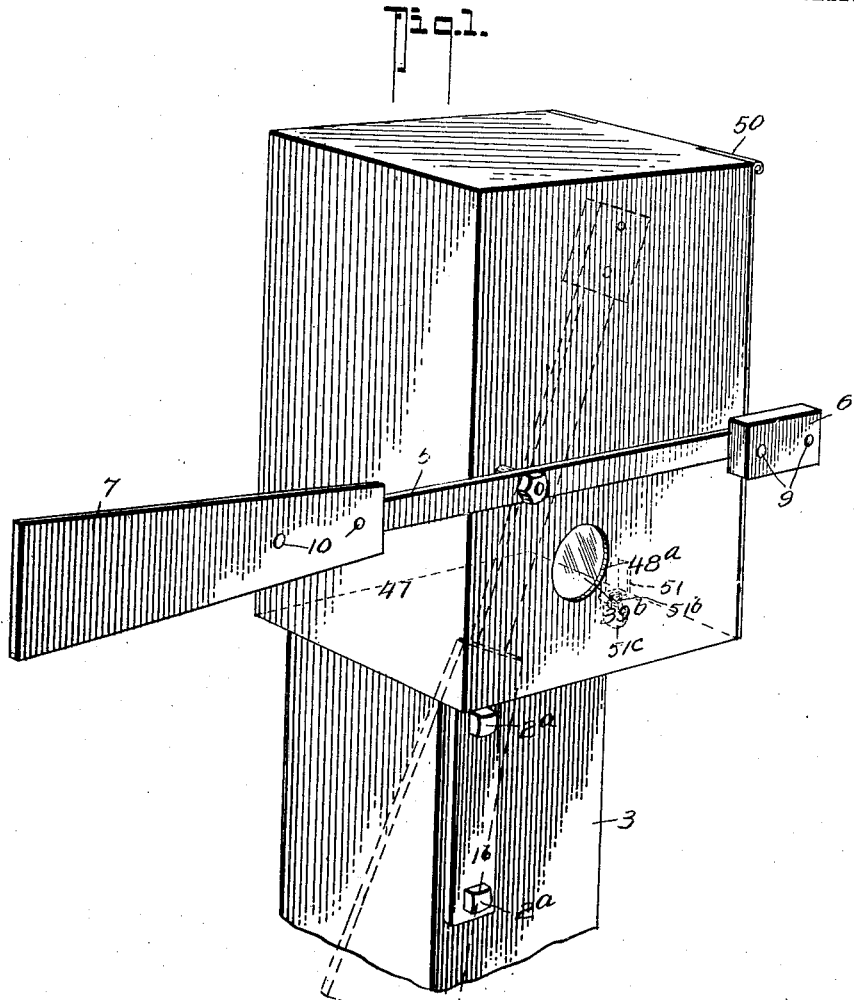
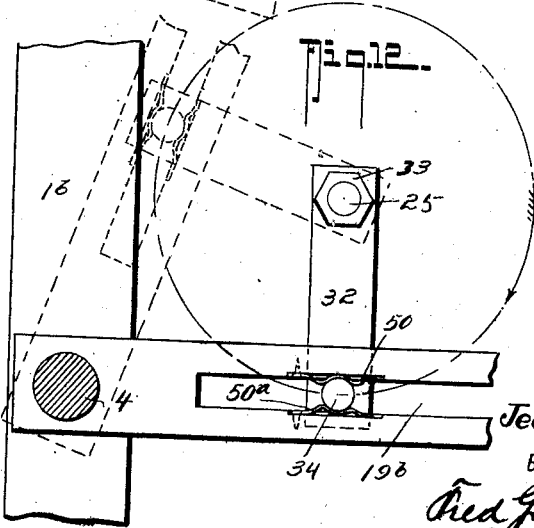
WITNESSES:
INVENTOR
Jean F. Webb Jr.
BY
Fred G. Dieterich & Co.
ATTORNEYS.

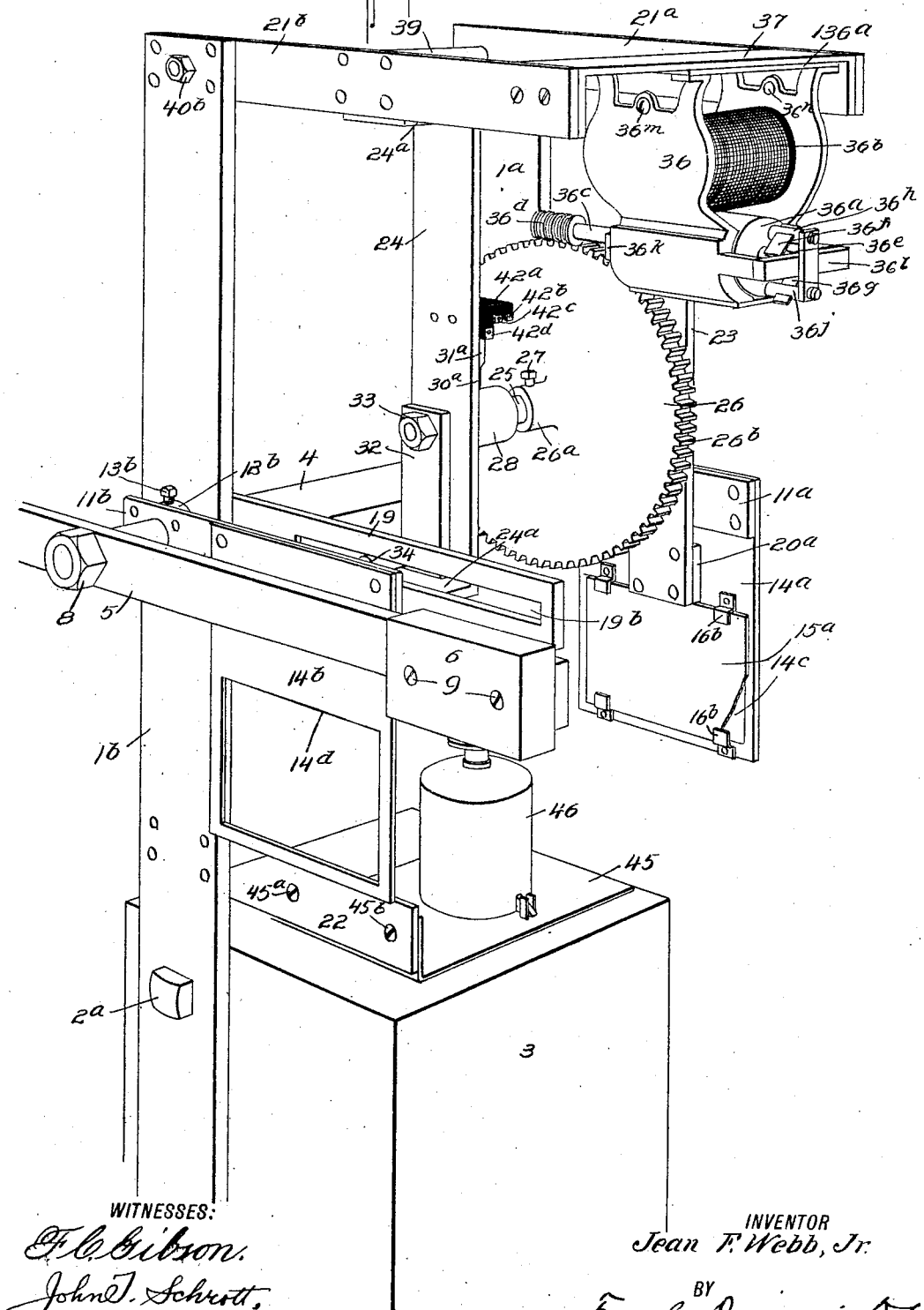

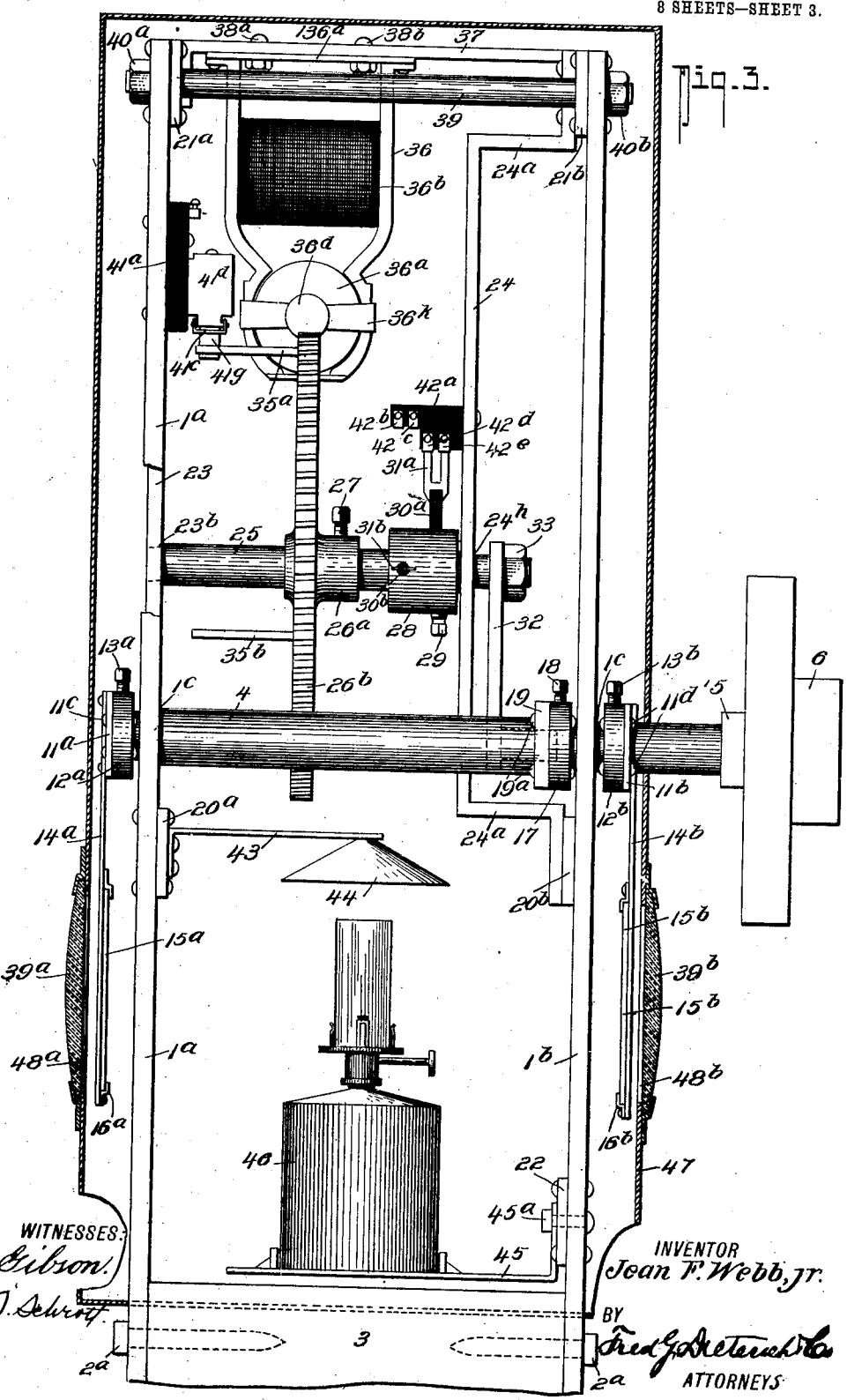

No. 830,629. PATENTED SEPT. 11, 1906.
J. F. WEBB, Jr.
SEMAPHORE.
APPLICATION FILED NOV. 11, 1905.

8 SHEETS—SHEET 4.

WITNESSES:
F. C. Gibson.
John T. Schrott.

INVENTOR
Jean F. Webb, jr.
BY
Fred G. Dieterich & Co.
ATTORNEYS.

No. 830,629. PATENTED SEPT. 11, 1906.
J. F. WEBB, Jr.
SEMAPHORE.
APPLICATION FILED NOV. 11, 1905.

8 SHEETS—SHEET 5.

WITNESSES.
F. C. Gibson
John D. Schrott

INVENTOR
Jean F. Webb, jr.
BY
Fred G. Dieterich & Co.
ATTORNEYS.

No. 830,629. PATENTED SEPT. 11, 1906.
J. F. WEBB, Jr.
SEMAPHORE.
APPLICATION FILED NOV. 11, 1905.
8 SHEETS—SHEET 6.
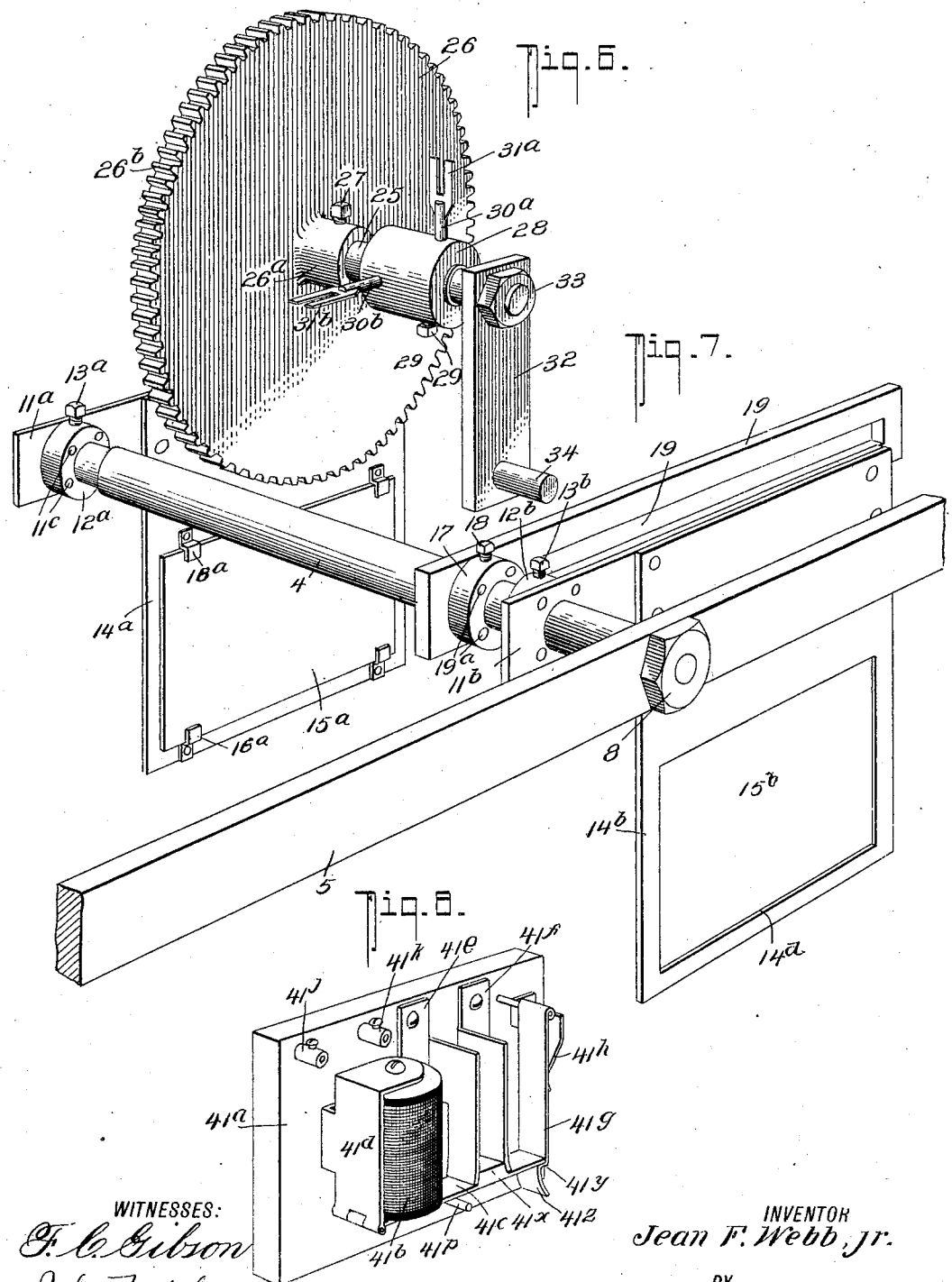
WITNESSES:
F. C. Gibson
John J. Schrott
INVENTOR
Jean F. Webb, Jr.
BY
Fred G. Dieterich & Co.
ATTORNEYS.

No. 830,629. PATENTED SEPT. 11, 1906.
J. F. WEBB, Jr.
SEMAPHORE.
APPLICATION FILED NOV. 11, 1905.
8 SHEETS—SHEET 7.
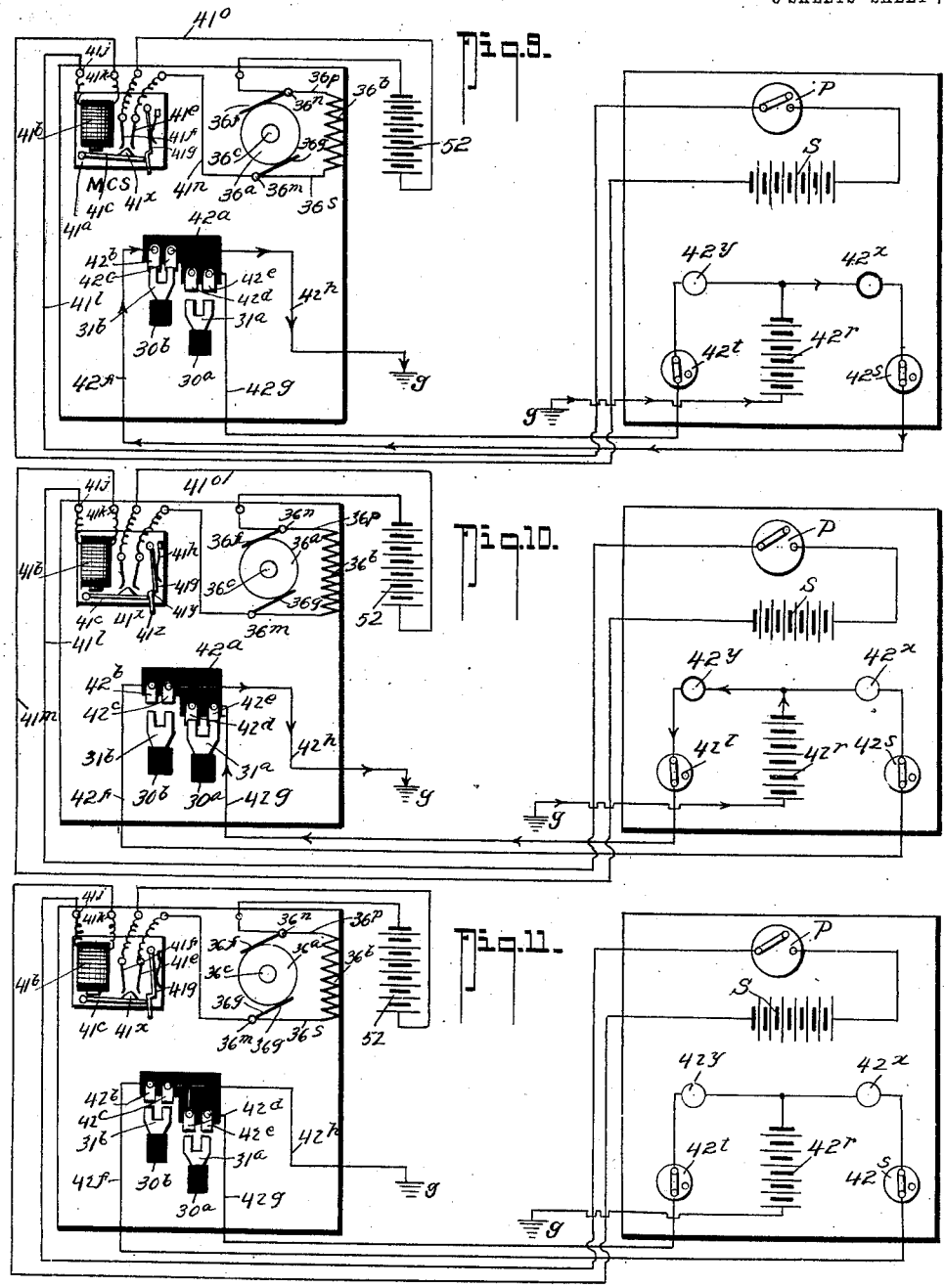
WITNESSES:
F. C. Gibson
John T. Schrott
INVENTOR
Jean F. Webb Jr.
BY
Fred G. Dieterich & Co
ATTORNEYS.

No. 830,629. PATENTED SEPT. 11, 1906.
J. F. WEBB, JR.
SEMAPHORE.
APPLICATION FILED NOV. 11, 1905.

8 SHEETS—SHEET 8.

WITNESSES:
F. C. Gibson.
John T. Schrott

INVENTOR
Jean F. Webb Jr.
BY
Fred G. Dieterich & Co.
ATTORNEYS.

UNITED STATES PATENT OFFICE.

JEAN F. WEBB, JR., OF DENVER, COLORADO, ASSIGNOR TO THE ELECTRIC SIGNAGRAPH AND SEMAPHORE COMPANY, A CORPORATION OF ARIZONA TERRITORY.

SEMAPHORE.

No. 830,629.

Specification of Letters Patent.

Patented Sept. 11, 1906.

Application filed November 11, 1905. Serial No. 286,875.

*To all whom it may concern:*

Be it known that I, JEAN F. WEBB, Jr., residing at Denver, in the county of Denver and State of Colorado, have invented certain new and useful Improvements in Semaphores, of which the following is a specification.

My invention relates to certain new and useful improvements in semaphores, and it primarily seeks to provide an electric-operating semaphore in which means are provided for presenting a "blade-signal" as well as a "light-signal," and in its generic nature my invention comprises a supporting-frame; a signaling-shaft carried by the supporting-frame which controls the signals, both "blade" and "light;" a rotatable operating-shaft; connections between the rotatable operating-shaft and the signaling-shaft, whereby the rotatable motion in the operating-shaft is converted into oscillating motion in the signal-shaft; an electric motor for rotating the operating-shaft; electrically-controlled means for starting the motor into operation; means for automatically cutting out the motor from operation at times, and means for sending in return-signals from the semaphore to the tower operator's station to indicate the position of the signals, and means whereby the signaling-shaft can be locked from movement when in the extreme danger or safety position.

The present invention has for its object to provide a semaphore of this character of a very simple and effective construction which can be readily and positively operated to serve its intended purposes and which can be easily and cheaply manufactured.

In its more subordinate features the invention consists in certain novel construction, combination, and arrangement of parts, all of which will be first described in detail and then be specifically pointed out in the appended claims, reference being had to the accompanying drawings, in which—

Figure 5:
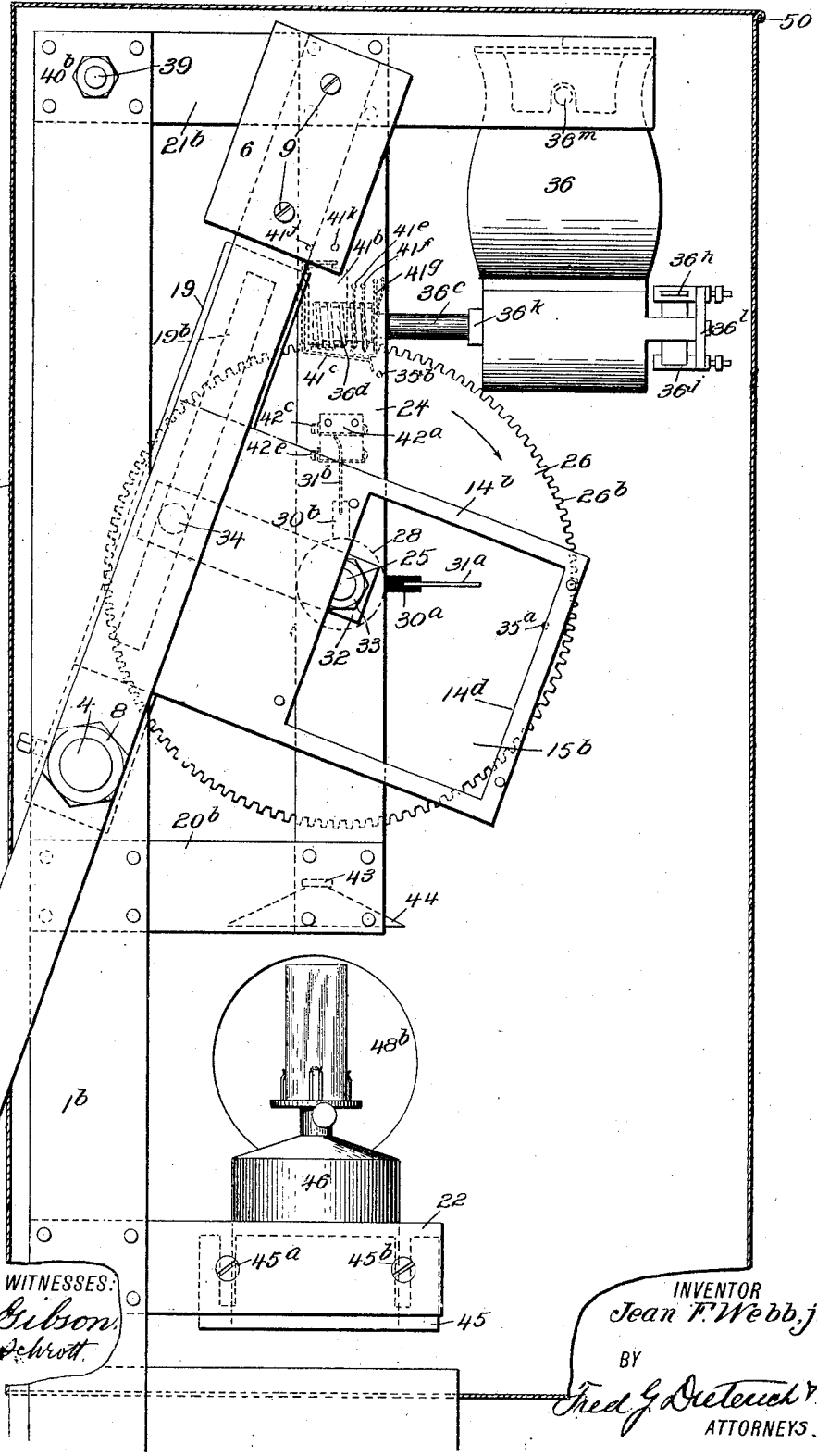
Figure 13:
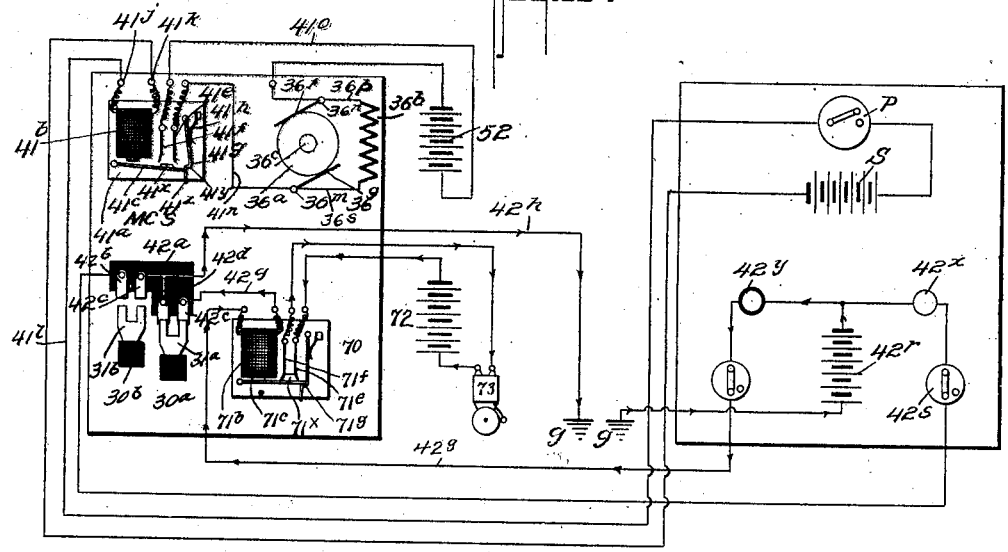
Figure 14:
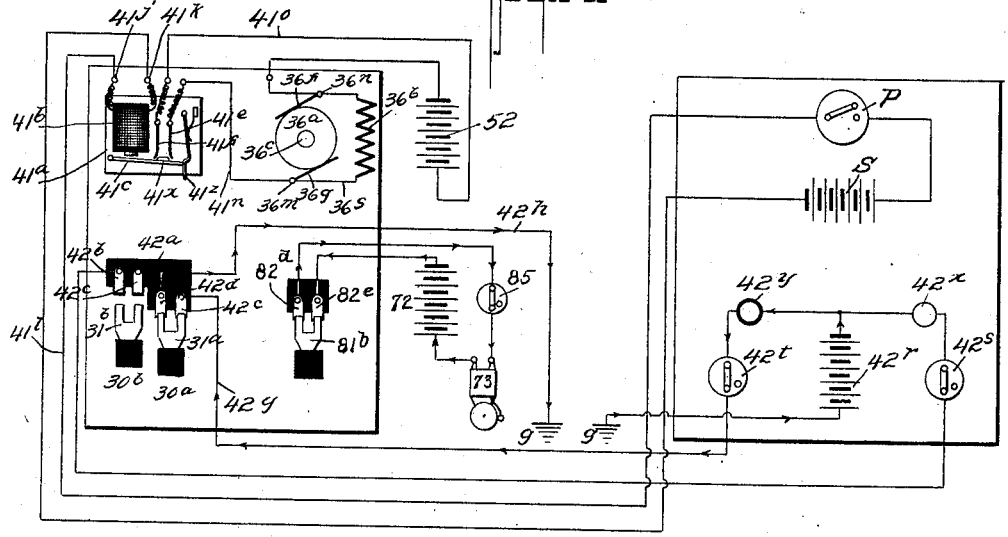

Figure 1 is a perspective view of my invention, the signal being shown in full lines in its danger position and in dotted lines in its safety position. Fig. 2 is a perspective view of my invention, showing the parts in their danger-indicating position, the cover or housing being removed to expose the interior mechanism. Fig. 3 is a front elevation showing the position of the parts when the blade is in the danger position, the housing being shown in section. Fig. 4 is a side elevation showing the position of the parts when the blade is in the danger position, and the cover or housing being shown in section. Fig. 5 is a similar view showing the position of the parts when the blade is in its safety position. Fig. 6 is a detail perspective view of the rotatable operating-shaft with its attached parts. Fig. 7 is a similar view of the signal-shaft with its attached parts. Fig. 8 is a detail perspective view of the electric-trip mechanism for controlling the motor. Fig. 9 is a diagrammatic view showing the circuits when the parts are in their safety position, the flowing current being designated by arrowheads. Fig. 10 is a similar view showing the position of the parts when the signal is set to its danger-indicating position. Fig. 11 is a diagrammatic view showing a slightly-modified arrangement of parts whereby the return-signal is merely instantaneous and not continuous and which will hereinafter be specifically referred to. Fig. 12 is a slightly-modified form of my invention hereinafter specifically referred to. Figs. 13 and 14 are diagrammatic views of modified form of my invention hereinafter specifically referred to.

Referring now to the accompanying drawings, in which like numerals and letters of reference indicate like parts in all of the figures, $1^a$ $1^b$ designate a pair of upright supports which are secured to a post 3 by screws $2^a$ $2^a$, as shown.

Mounted in bearings $1^c$ $1^c$ in the uprights $1^a$ $1^b$ is a shaft 4, which I shall hereinafter term the "signal-shaft," and the shaft 4 projects beyond the supports $1^a$ $1^b$ and carries a signal-bar 5, to one end of which a counter-weight 6 is secured by bolts 9 9, while a semaphore-blade 7 is secured to the other end of the bar 5 by bolts 10 10, as shown. A nut 8, threaded onto the signal-shaft 4, serves to hold the bar 5 in place. At the other end adjacent the upright support $1^a$ I secure a collar $12^a$ to the shaft 4 by a set-screw $13^a$, a similar collar $12^b$ being attached to the shaft 4 adjacent the other support $1^b$ by a set-screw $13^b$.

$11^a$ $11^b$ designate arms carried by the shaft 4, one $11^a$ adjacent the collar $12^a$, to which it is secured by screws or rivets 11ᶜ 11ᶜ, and the other arm 11ᵇ adjacent the collar 12ᵇ, to which it is secured by screws or rivets 11ᵈ 11ᵈ. Riveted or otherwise secured to the arms 11ᵃ 11ᵇ are brackets 14ᵃ 14ᵇ, respectively, which brackets have openings 14ᶜ 14ᵈ, respectively, covered by glass plates (preferably red) 15ᵃ 15ᵇ, respectively. Clips 16ᵃ 16ᵇ serve to attach the glass plates 15ᵃ 15ᵇ to their respective brackets 14ᵃ 14ᵇ.

Mounted on the shaft 4, adjacent one support 1ᵇ, is a collar 17, which is secured in place by a set-screw 18, as shown. An arm or lever 19 is attached to the collar 17 by rivets or screws 19ᵃ 19ᵃ, and the arm 19 is slotted, as at 19ᵇ, for a purpose presently understood.

20ᵃ 20ᵇ designate bars secured below the shaft 4 to the supports 1ᵃ 1ᵇ and projecting out at right angles thereto, to which bars and a pair of similar bars 21ᵃ 21ᵇ, attached to the supports 1ᵃ 1ᵇ, respectively, at the top, the upright supplemental supporting-bars 23 24 are fastened. The bar 24 is bent inwardly, as at 24ᵃ 24ᵃ, toward the bar 23, as shown.

Mounted in bearings 23ᵇ 24ʰ in the bars 23 24 is a rotatable shaft 25, hereinafter called the "rotatable drive or power shaft," one end of which projects beyond the support 24 and receives a crank-arm 32, which is secured in place by a nut 33. The crank-arm 32 at its free end has a wrist-pin 34, which passes into the slot 19ᵇ of the arm 19 to operatively connect the arm 19 with the crank 32. Secured to the drive-shaft 25 by a set-screw 27, passing through a collar 26ᵃ, is a gear-wheel 26, having peripheral teeth 26ᵇ 26ᵇ of the worm-gear type, for a purpose presently understood.

28 designates a broad collar attached to the shaft 25 by a set-screw 29, and the collar 28 carries a pair of suitably-spaced fiber or other insulated radial blocks 30ᵃ 30ᵇ, which carry circuit-closing brushes 31ᵃ 31ᵇ, respectively, to close the return-signal circuits, hereinafter referred to.

The gear-wheel 26 carries a pair of trip fingers or pins 35ᵃ 35ᵇ, spaced a suitable distance apart to correspond with the blocks or plugs 30ᵃ 30ᵇ, hereinbefore referred to, and the fingers 35ᵃ 35ᵇ serve to release the motor-controlling switch to cut out the motor from operation at proper intervals, as will be hereinafter fully understood.

Above the collar 28 an insulated block 42ᵃ is secured to the support 24 by screws or other suitable means, and the block 42ᵃ carries two pairs of contacts 42ᵇ 42ᶜ and 42ᵈ 42ᵉ, one contact 42ᶜ 42ᵈ of each pair being electrically connected together and grounded through the connection 42ʰ, while the other terminals 42ᵇ 42ᵉ, respectively, connect to the return-signal wires 42ᶠ 42ᵍ, which contain in their circuit the return-signals 42ˣ 42ʸ, respectively, and the cut-out switch 42ˢ 42ᵗ, respectively. A source of electric energy 42ʳ connects signal-wires 42ᶠ 42ᵍ to the ground, as diagrammatically shown in Figs. 9, 10, and 11.

37 designates a cross-bar secured to the arms 21ᵃ 21ᵇ, to which the attaching bar or bed-plate 136ᵃ of the motor 36 is secured by bolts 38ᵃ 38ᵇ. The motor 36 has an armature 36ᵃ and a field 36ᵇ of the usual type and has its shaft 36ᶜ mounted in bearings in the brackets 36ᵏ 36ˡ, respectively, as shown. A worm 36ᵈ is secured to the shaft 36 and meshes with a worm gear-wheel 26, whereby the motion of the shaft 36ᶜ is imparted to the shaft 25. A spacing-rod 39 is secured between the supports 1ᵃ 1ᵇ at their top by nuts 40ᵃ 40ᵇ.

36ᵃ designates the motor-commutator with which the brushes 36ᶠ 36ᵍ coöperate. The brushes 36ᶠ 36ᵍ are held by brush-holders 36ʰ 36ʲ, respectively, to which the field-wire terminals 36ᵖ 36ˢ, respectively, connect.

36ᵐ 36ⁿ designate binding-posts, one of which, 36ⁿ, connects with a terminal of the motor-operating source of electric energy 52, while the other terminal, 36ᵐ, connects with one terminal 41ᵉ of the motor-controlled switch MCS through wire 41ⁿ. The other terminal 41ᶠ of such switch connects with the other terminal of the source of electric energy through the wire 41°. The motor-field and armature-terminals connect with the posts 36ᵐ 36ⁿ, as shown.

The switch MCS comprises an insulated base 41ᵃ, secured to the bar 23, upon which base a circuit-closing magnet 41ᵇ is mounted. To the magnet 41ᵇ the line-wires 41ˡ 41ᵐ of the operating-circuit are secured.

41ᶜ designates the armature for the magnet 41ᵇ, which armature carries a closure-contact 41ˣ for coöperating with the contacts 41ᵉ 41ᶠ, and the said armature is prevented from dropping too far by a stop 41ᵖ.

The magnet 41ᵇ and its armature 41ᶜ are mounted on a frame 41ᵈ, and the magnet and the line-wire terminals unite through the binding-posts 41ʲ 41ᵏ.

A trip-bar 41ᵍ is fulcrumed on the block 41ᵃ and has a shoulder 41ʸ for receiving the armature 41ᶜ to lock it in its circuit-closing position and a finger-tripping portion 41ᶻ to be engaged by the pins 35ᵃ 35ᵇ during their movement at predetermined times, as will be presently more fully explained. A long spring 41ʰ holds the trip-bar 41ᵍ in its normal position.

22 designates an arm secured to the support 1ᵇ below the shaft 4, which arm has a bracket 45 attached thereto by bolts 45ᵃ 45ᵇ, as shown.

46 designates a lamp carried by the bracket 45. A hood 44 is held over the lamp 46 by being secured to a frame 43, which is in turn secured to the arm 20ᵃ, before referred to.

The housing 47 incloses the entire operating mechanism of the device, and the housing 47 is provided with signaling windows or openings 48ᵃ 48ᵇ, covered by glass covers 39$^a$ 39$^b$ of white lenses which register with the lamp 46 and with the signal-disks 15$^a$ 15$^b$ when the signal is in its danger-indicating position.

50 is a hinge for the door back of the covering 47, by means of which the door is secured to the housing.

51 designates a hasp riveted to the bottom part of the door of covering 47, while a staple 51$^b$ is secured to the bottom of the covering 47, and a lock 51$^c$ locks the hasp and staple together to keep the door locked shut.

Instead of running two line-wires 41$^l$ 41$^m$ from the signal to the power-operating station one line-wire 41$^m$ may be grounded at the signal and also at the station, as shown. The other line-wire 41$^l$ at the tower operator's station is in circuit with the switch-button P and a suitable source of electric energy S, as shown, whereby the signal setting main circuit can be closed to energize the magnet 41$^b$ to close the motor-circuit in a manner presently explained.

The line-wire 42$^g$ preferably contains a red signal-light 42$^y$ at the tower operator's station and a suitable cut-out switch, as shown, while the line-wire 42$^f$ contains a white signal-light 42$^x$ and a cut-out switch, as shown.

Operation: Assuming the parts to be in the position shown in Fig. 2, which is the danger-indicating position, with the danger-indicating return-signal set and the semaphore-blade and light-signal at their danger-indicating points, the armature 41$^c$ of the motor-control switch being down to open the motor-circuit and the parts being at rest. Now assume that the operator desires to move the blade into the safety position. He merely presses the button in the main circuit, thus closing the main circuit to energize the magnet 41$^b$, which in turn raises the armature 41$^c$ and closes the motor-circuit through the contacts 41$^e$ 41$^f$, thus permitting the motor to rotate, and in doing so its motion will be communicated to the wheel 26 to turn it in the direction of the arrow in Fig. 4, thus causing the crank-arm 32 to be rotated, which causes the shaft 4 to rock and carry with it the arm 5 until the parts are moved to the position indicated in Fig. 5, which shows the parts in the safety position. As soon as the parts reach their safety-indicating position the circuit-closer 31$^b$ will close the return-signal circuits at contacts 42$^b$ 42$^c$, and thus operate the white signal-light at the tower operator's station, and at the same time the pin 35$^b$ will engage the finger-trip 41$^z$ of the trip-bar 41$^g$ and release the armature 41$^c$, which opens the motor-circuit at the contacts 41$^e$ 41$^f$ and permits the motor to stop operating. The momentum of the parts will carry the wheel 26 a slight distance farther sufficient to permit the pin 35$^b$ disengaging itself from the trip-bar 41$^g$. The parts are now in their normal or safety position, as indicated in Fig. 5, with the white light showing directly through the white lenses 49$^a$ 49$^b$, the red glasses 15$^a$ 15$^b$ being held up and out of alinement with the light by the arms 11$^a$ 11$^b$ and the brackets 14$^a$ 14$^b$. When the operator desires to move the blade into the danger position, he momentarily closes in his office the electric circuit through the wires 41$^l$ 41$^m$ and magnet 41$^b$ by means of the push-button or switch in the tower operator's office, thus causing magnet 41$^b$ to again attract armature 41$^c$, which then closes the circuit between the contacts 41$^e$ 41$^f$, permitting the motor to run. The armature is held up after the current is cut off from magnet 41 by reason of the shoulder on the trip-bar 41$^g$ supporting it, thus maintaining the circuit closed during the proper intervals. As the motor revolves this motion is again imparted to the wheel 26 to turn the shaft 25 through the worm 36$^d$ and the wheel 26. The revolution of the shaft 25, which has the arm 32 attached to it, causes wrist-pin 34, which is secured to the outer end of the arm 32, to describe a circle, as shown by dotted and dash lines in Fig. 12. The wrist-pin 34 being constantly engaged in the slot of the arm 19 causes said arm with each revolution of the shaft 25 to oscillate and describe an arc of a circle. As the arm 19 is fastened at its inner end to shaft 4 the movement of the arm 19 is communicated to shaft 4, which in turn communicates the same movement to the bar 5, to which the signal-blade 7 is attached, thus raising and lowering the blade 7 as the arm 19 is moved. In moving from the safety to the danger position the arm 19 is lowered and the blade 7 being on the opposite side of the shaft 4 is raised to the position shown in Figs. 1 and 2. As before stated, the wheel 26 has two pins 35$^a$ 35$^b$ projecting from the side toward the support 1$^a$, and as the worm 36$^d$ rotates the wheel 26 in moving the blade 7 to danger position just as the danger position is reached the pin 35$^a$ engages the bottom part of the vertical portion of trip-bar 41$^g$, pulling such trip-bar 41$^g$ away so that its shoulder disengages armature 41$^c$, which permits said armature to drop away from contact with the contact terminals 41$^e$ 41$^f$, and thus break the circuit from battery 52 to the motor 36 and cause motor 36 to stop. The momentum of the parts carries the pin 35$^a$ beyond and out of engagement with the trip-bar 41$^{g'}$. As the blade 7 is raised to its danger position the red glass 15$^a$ 15$^b$ will be brought into register with the white lenses, causing the light to show red. As the signal reaches its danger position the contact 31$^a$ will close the return-signal circuit in which the red or danger-indicating light is located, and thus set the return-signal to show "danger."

The return-signals may be kept lighted so long as the semaphore is set or until the operator breaks the circuit by the switch at his office; but if it be found desirable in practice that the return-signal be but momentary the contact-brushes 31ª 31ᵇ may be set a little in advance of the position shown in Figs. 1, 2, and 3 to the relative position shown diagrammatically in Fig. 11, so that the contacts 31ª 31ᵇ will move out of engagement with their respective operating-signal contacts as the pins 35ª 35ᵇ, respectively, engage the trip-bar 41ᵍ, thus breaking the return signal-circuit just prior to stopping the motor.

The operation may be repeated at the will of the operator, the motor being always stopped at the proper time by the automatic breaking of the circuit to its battery, and the operator is always notified of the position of the blade 7 by the signal given through the contact brushes and plates and the supplemental return-signal circuits.

It will be noticed that by reason of the corelative positions of the shafts 4 and 25 and the arms 19 and 32 when the parts are in the extreme positions, either safety or danger, the arm 32 will form a right angle with the arm 19, and thus, as it were, lock the shafts 4 and 25 from rotation due to the attempted movement of the blade or the arm 5 from without the housing 47. In other words, should the blade be in the safety position and any one attempt to turn the signal by grasping the arm 5 and moving it, this will be impossible, as the arm 32 and the arm 19 are at right angles to each other, and hence in their neutral position. The same is also true of the parts when they are in their danger-indicating position.

To more positively lock the parts in such positions, the arm 19 may be provided in its groove 19ᵇ with curved spring members 50 50ª to engage the wrist-pin 34 as the parts reach the extreme limit of their safety and danger positions to more positively hold the arm 32 and the arm 19 at right angles to one another, as shown in the modified form of Fig. 12.

Whenever it is desired to attract local attention to the movement of the blade 7—say at night at a small station where there is no night telegraph-operator or in any other case—a switch 70 (preferably a duplicate of the motor-control switch MCS) may be placed in circuit with the wire 42ᵍ, so that the current will pass through the magnet 71ᵇ of such switch whenever the blade 7 is raised to the danger position, and thus attract its armature 71ᶜ and cause its closure-contact 71ˣ to close the circuit between its contacts 71ᵉ 71ᶠ. Connected with the contacts 71ᵉ 71ᶠ is a battery 72 and a bell 73 in the station-agent's bedroom or office, or both, or any desired place, and the raising of the blade 7 to the danger position will thus cause said bell to ring and continue ringing until the circuit is broken by the agent tripping the bar 71ᵍ. (See Fig. 13.)

Instead of arranging the apparatus as shown in Fig. 13, a third circuit-closer 81ᵇ, like the circuit-closer 31ᵇ, can be placed on the collar 28 and close a local circuit through contact-blades 82ᵉ 82ᵈ, in which circuit a bell 73 and a battery 72 is connected so that the bell will ring when the blade 7 is in the danger position until the circuit is broken by the station agent through the medium of a switch 85 or any other desired means.

From the foregoing description, taken in connection with the accompanying drawings, it is thought the complete construction, operation, and many advantages of my invention will be readily understood by those skilled in the art to which it appertains.

Having thus described my invention, what I claim, and desire to secure by Letters Patent, is—

1. In a semaphore of the class described, an oscillating signal-shaft, a semaphore-arm on said signal-shaft, a rotatable drive-shaft, a crank on the drive-shaft and a slotted arm on the signal-shaft coöperatively directly connected whereby the signal-shaft may be operated by the rotatable shaft, an electrically-operated means for unidirectionally rotating said drive-shaft, and a circuit-controller for said electrically-operated means, and means carried by the drive-shaft for opening said controller at times to break the electric circuit substantially as shown and described.

2. In a signaling apparatus, an oscillating semaphore, a rotatable drive-shaft, an oscillating semaphore, a crank on the drive-shaft, a slotted arm on the semaphore-shaft for coöperating with said crank, electrically-operating means for intermittently rotating the drive-shaft always in the same direction to oscillate the semaphore to alternately display safety and danger signals, a circuit-controller for said electrically-operated means, and means carried by the drive-shaft for operating said circuit-controller to break the electric circuit of the electrically-operated means substantially as shown and described.

3. In a semaphore of the class described, an oscillating signal-shaft, a semaphore-arm on said signal-shaft, a rotatable drive-shaft, connections between the drive-shaft and the semaphore whereby the rotary motion of the drive-shaft is converted into oscillating motion at the semaphore, an electric motor for imparting unidirectional rotation to the drive-shaft, an electric operating-circuit for said motor, a circuit-controller within said electric circuit, means carried by the drive-shaft for operating the circuit-controller to open the electric circuit, and electromagnetic devices for operating the circuit-controller to close the circuit at times substantially as shown and described.

4. A semaphore, comprising an oscillatable signaling-shaft, a unidirectionally-rotatable drive-shaft, a crank on said drive-shaft, a slotted arm on said signal-shaft coöperating with said crank, an electrically-operating mechanism for intermittently rotating the drive-shaft unidirectionally, said electrically-operating mechanism including an electric motor and an operating-circuit therefor, a circuit-controller within said operating-circuit, means for automatically operating said circuit-controller to open the circuit intermittently, and manually-controlled electromagnetic devices for operating the circuit-controller to close the motor-circuit at times, substantially as shown and described.

5. A semaphore of the class described, comprising an oscillating signal-carrying shaft, and a rotatable drive-shaft, a crank on the drive-shaft and a slotted arm on the signal-shaft coöperatively connected with the crank, said connections between the rotatable drive-shaft and the signal-carrying shaft including means for locking said signal-carrying shaft from rotation at times, electrically-operated means for rotating said drive-shaft, in one direction only, to oscillate the signal-shaft, substantially as shown and described.

6. In a signaling apparatus, an oscillating signal-carrying shaft, a rotatable drive-shaft coöperatively connected therewith, means for rotating the drive-shaft always in one direction to oscillate the signal-shaft to alternately display safety and danger signals, and return-signaling circuits including circuit-closers coöperatively connected with the semaphore-operating mechanism for operating return-signals at each movement of the semaphore-signals, substantially as shown and described.

7. A signaling apparatus comprising an oscillatable semaphore-carrying shaft, a rotatable drive-shaft, a slotted arm on the semaphore-shaft, a crank on the rotatable drive-shaft having a pin for engagement in said slot of the arm, an electrically-operated means for unidirectionally rotating the drive-shaft to oscillate the semaphore-shaft, and means carried by the slotted arm for locking the pin and arm together at times to hold the semaphore from movement when the drive mechanism ceases to operate at times, substantially as shown and described.

8. An apparatus of the class described, comprising an oscillating semaphore-signal-carrying shaft and a rotatable drive-shaft coöperatively connected therewith to impart oscillatory motion to the signal-shaft, electrically-controlled mechanism for intermittently rotating said drive-shaft unidirectionally, return-signaling circuits including circuit-closers coöperatively connected with the semaphore-operating mechanism for operating return-signals at each movement of the semaphore, substantially as shown and described.

9. An apparatus of the class described, comprising an oscillating semaphore-signal-carrying shaft and a rotatable drive-shaft coöperatively connected therewith to impart oscillatory motion to the signal-shaft, electrically-controlled mechanism for intermittently rotating said drive-shaft unidirectionally, return-signaling circuits including circuit-closers coöperatively connected with the semaphore-operating mechanism for operating return-signals at each movement of the semaphore, and means for automatically rendering said electrically-controlled mechanism inoperative at times, substantially as shown and described.

10. In an apparatus of the class described, an oscillating semaphore-signal-carrying shaft, a rotatable drive-shaft, connections between said drive-shaft and said signal-shaft whereby the motion of the former is imparted oscillatingly to the latter, electrically-operating mechanism for rotating said drive-shaft unidirectionally, means for automatically cutting out said electrically-operating mechanism at times, and means for simultaneously operating a return-signal substantially as shown and described.

11. In an apparatus of the class described, an oscillating semaphore-signal-carrying shaft, a rotatable drive-shaft, connections between said drive-shaft and said signal-shaft whereby the motion of the former is imparted oscillatingly to the latter, electrically-operating mechanism for rotating said drive-shaft unidirectionally, means for automatically cutting out said electrically-operating mechanism at times, means for simultaneously operating a return-signal, and electrically-controlled mechanism for again cutting in said electrically-operating mechanism at times, substantially as shown and described.

12. In an apparatus of the class described, an oscillating signal-shaft, a rotatable drive-shaft, means for rotating said drive-shaft unidirectionally, connections between said rotatable shaft and said oscillating signal-shaft for coöperatively connecting the same, said connections including means for locking said signal-shaft from oscillation by external operation, and said connections comprising a crank carried by the drive-shaft, and a slotted arm carried by the signal-shaft, substantially as shown and described.

13. A semaphore of the class described, comprising an oscillatable signal-carrying shaft, a unidirectional rotatable drive-shaft, a crank secured to the drive-shaft, a lever secured to the signal-shaft having a slotted portion for coöperatively connecting with the crank, a unidirectionally-rotatable shaft, electric motor, gear connections between the motor and the drive-shaft, substantially as shown and described.

14. A semaphore of the class described, comprising an oscillatable signal-carrying shaft, a unidirectional rotatable drive-shaft, a crank-shaft secured to the drive-shaft, an arm secured to the signal-shaft having a slotted portion for coöperating with said crank, a unidirectionally-rotatable shaft electric motor, gear connections between the motor and the drive-shaft, an automatically-operated circuit-controller for cutting out the drive-motor at times, and manually-controlled electromagnetic means for operating the circuit-controller to cut in the motor at times, substantially as shown and described.

15. In a semaphore of the class described, an oscillatable signal-carrying shaft, a rotatable drive-shaft, a crank carried by the drive-shaft, a slotted lever carried by the signaling-shaft and coöperatively connected with the drive-shaft crank whereby the latter may be operated by the former, an electric motor for rotating said drive-shaft unidirectionally, gear connections between the electric motor and the drive-shaft and means for automatically opening the motor-circuit at times, substantially as shown and described.

16. In a semaphore of the class described, an oscillatable signal-carrying shaft, a rotatable drive-shaft, connections between the drive-shaft and the signaling-shaft whereby the latter may be operated by the former, an electric motor for rotating said drive-shaft unidirectionally, means for automatically opening the motor-circuit at times, and return-signal circuits controlled by said drive-shaft for operating a return-signal as the motor-circuit is opened, substantially as shown and described.

17. In a semaphore of the class described, an oscillatable signal-carrying shaft, a rotatable drive-shaft, connections between the drive-shaft and the signaling-shaft whereby the latter may be operated by the former, an electric motor for rotating said drive-shaft unidirectionally, means for automatically opening the motor-circuit at times, and an electrically-controlled means for again closing the motor-circuit said connections between the drive and signaling shafts comprising a slotted arm carried by the signaling-shaft, and a crank carried by the drive-shaft for coöperating with the slotted arm substantially as shown and described.

18. In a semaphore of the class described, an oscillatable signal-carrying shaft, a rotatable drive-shaft, connections between the drive-shaft and the signaling-shaft whereby the latter may be operated by the former, an electric motor for rotating said drive-shaft unidirectionally, means for automatically opening the motor-circuit at times, return-signals controlled by said drive-shaft for operating a return-signal as the motor-circuit is opened, and electrically-controlled means for again closing the motor-circuit.

19. In a semaphore of the class described, an oscillatable signal-carrying shaft, a rotatable drive-shaft, a crank on the drive-shaft and a slotted arm on the signal-shaft for coöperating with the crank whereby the signaling-shaft may be operated by the drive-shaft, an electric motor for rotating said drive-shaft unidirectionally, gear connections between the electric motor and the drive-shaft means for automatically opening the motor-circuit at times, and means for locking the oscillating shaft from oscillation by application of external means when the motor is at rest, substantially as shown and described.

20. In a semaphore of the class described, an oscillatable signal-carrying shaft, a rotatable drive-shaft, connections between the drive-shaft and the signaling-shaft whereby the latter may be operated by the former, an electric motor for rotating said drive-shaft unidirectionally, means for automatically opening the motor-circuit at times, return-signal circuits controlled by said drive-shaft for operating a return-signal as the motor-circuit is opened, and means for locking the oscillating shaft from oscillation by application of external means when the motor is at rest, substantially as shown and described.

21. In a semaphore of the class described, an oscillatable signal-carrying shaft, a rotatable drive-shaft, connections between the drive-shaft and the signaling-shaft whereby the latter may be operated by the former, an electric motor for rotating said drive-shaft unidirectionally to the operating-signal shaft, means for automatically opening the motor-circuit at times, an electrically-controlled means for again closing the motor-circuit, and means for locking the oscillating shaft from oscillation by application of external means when the motor is at rest said connections between the drive and signaling shafts comprising a crank carried by the drive-shaft and a slotted arm carried by the signaling-shaft coöperatively connected with the crank substantially as shown and described.

22. In a semaphore of the class described, an oscillatable signal-carrying shaft, a rotatable drive-shaft, connections between the drive-shaft and the signaling-shaft whereby the latter may be operated by the former, an electric motor for rotating said drive-shaft unidirectionally, and means for automatically opening the motor-circuit at times, return-signals controlled by said drive-shaft for operating a return-signal as the motor-circuit is opened, electrically-controlled means for again closing the motor-circuit, and means for locking the oscillating shaft from oscillation by application of external means when the motor is at rest, substantially as shown and described.

23. In an apparatus of the class described, a main support, a signal-shaft mounted therein, a supplemental support secured to the main support, a drive-shaft mounted in said supplemental support, a crank-arm secured to said drive-shaft, an arm secured to said signaling-shaft, pin-and-slot connections between said arms, electrically-operating means for imparting unidirectional rotary movement to said drive-shaft to set the signals, substantially as shown and described.

24. In an apparatus of the class described, a main support, a signal-shaft mounted therein, a supplemental support secured to the main support, a drive-shaft mounted in said supplemental support, a crank secured to said drive-shaft, an arm secured to said signaling-shaft, pin-and-slot connections between said arms, electrically-operating means for imparting unidirectional rotary movement to said drive-shaft to set the signals, and electromechanically-controlled devices for cutting in and cutting out the motor from operation substantially as shown and described.

25. In an apparatus of the class described, a main support, a signal-shaft mounted therein, a supplemental support secured to the main support, a drive-shaft mounted in said supplemental support, a crank-arm secured to said drive-shaft, an arm secured to said signaling-shaft, pin-and-slot connections between said arms, electrically-operating means for imparting unidirectional rotary movement to said drive-shaft to set the signal, means for automatically opening the motor-circuit at times, substantially as shown and described.

26. In an apparatus of the class described, a main support, a signal-shaft mounted therein, a supplemental support secured to the main support, a drive-shaft mounted in said supplemental support, a crank-arm secured to said drive-shaft, an arm secured to said signaling-shaft, pin-and-slot connections between said arms, electrically-operating means for imparting unidirectional rotary movement to said drive-shaft to set the signals, means controlled by the rotatable drive-shaft for automatically opening the motor-circuit at times, substantially as shown and described.

27. In an apparatus of the class described, a main support, a signal-shaft mounted therein, a supplemental support secured to the main support, a drive-shaft mounted in said supplemental support, a crank-arm secured to said drive-shaft, an arm secured to said signaling-shaft, pin-and-slot connections between said arms, electrically-operating means for imparting unidirectional rotary movement to said shaft to set the signals, means controlled by the rotatable drive-shaft for automatically opening the motor-circuit at times, and means controlled by the semaphore mechanism for operating return-signals when the semaphore-signals are set.

28. In an apparatus of the class described, a main support, a signal-shaft mounted therein, a supplemental support secured to the main support, a drive-shaft mounted in said supplemental support, a crank-arm secured to said drive-shaft, an arm secured to said signaling-shaft, pin-and-slot connections between said arms, electrically-operating means for imparting unidirectional rotary movement to said shaft to set the signals, means controlled by the semaphore mechanism for operating return-signals when the semaphore-signals are set.

29. In an apparatus of the class described, a main support, a signal-shaft mounted therein, a supplemental support secured to the main support, a drive-shaft mounted in said supplemental support, a crank-arm secured to said drive-shaft, an arm secured to said signaling-shaft, pin-and-slot connections between said arms, electrically-operating means for imparting unidirectional rotary movement to said shaft to set the signal, means for automatically opening the motor-circuit at times, and an electrically-energized means for closing the motor-circuit at times.

30. In an apparatus of the class described, a main support, a signal-shaft mounted therein, a supplemental support secured to the main support, a drive-shaft mounted in said supplemental support, a crank-arm secured to said drive-shaft, an arm secured to said signaling-shaft, pin-and-slot connections between said arms, electrically-operating means for imparting unidirectional rotary movement to said shaft to set the signals, means for automatically opening the motor-circuit at times, and electrically-energized means for closing the motor-circuit at times, and means controlled by the semaphore mechanism for operating return-signals when the semaphore-signals are set, substantially as shown and described.

31. In an apparatus of the class described, supporting-standards having bearing portions, a signal-carrying shaft mounted therein, a semaphore-signal-carrying arm secured to the shaft, a slotted operating-arm secured to the shaft, a rotatable drive-shaft mounted in bearings in said support, a crank-arm connected to said drive-shaft, a wrist-pin on said crank-arm to enter the slot, in said operating-arm, and an electric motor geared to said drive-shaft to rotate it to operate the signals, substantially as shown and described.

32. In an apparatus of the class described, upright supporting-standards having bearing portions, a signal-shaft mounted therein, a semaphore-signal-carrying arm secured to the shaft, a slotted operating-arm secured to the shaft, a rotatable drive-shaft mounted in bearings in said support, a crank-arm connected to said drive-shaft, a wrist-pin on said crank-arm to enter the slot in said operating-arm, an electric motor geared to said drive-shaft to rotate it, a motor-circuit, a switch in said motor-circuit, and means controlled by the movement of the drive-shaft for opening said switch at times.

33. In an apparatus of the class described, upright supporting-standards having bearing portions, a signal-shaft mounted therein, a semaphore-signal-carrying arm secured to the shaft, a slotted operating-arm secured to the shaft, a rotatable drive-shaft mounted in bearings in said support, a crank-arm connected to said drive-shaft, a wrist-pin on said crank-arm to enter the slot in said operating-arm, an electric motor geared to said drive-shaft to rotate it, a motor-circuit, a switch in said motor-circuit, means controlled by the movement of the drive-shaft for opening said switch at times, and electromagnetic devices for closing said switch at times.

34. In an apparatus of the class described, upright supporting-standards having bearing portions, a signal-shaft mounted therein, a semaphore-signal-carrying arm secured to the shaft, a slotted operating-arm secured to the shaft, a rotatable drive-shaft mounted in bearings in said support, a crank-arm connected to said drive-shaft, a wrist-pin on said crank-arm to enter the slot in said operating-arm, an electric motor geared to said drive-shaft to rotate it, a motor-circuit, a switch in said motor-circuit, means controlled by the movement of the drive-shaft for opening said switch at times, electromagnetic devices for closing said switch at times, and means for locking said switch to its closed position.

35. In an apparatus of the class described, upright supporting-standards having bearing portions, a signal-shaft mounted therein, a semaphore-signal-carrying arm secured to the shaft, a slotted operating-arm secured to the shaft, a rotatable drive-shaft mounted in bearings in said support, a crank-arm connected to said drive-shaft, a wrist-pin on said crank-arm to enter the slot in said operating-arm, an electric motor geared to said drive-shaft to rotate it, a motor-circuit, a switch in said motor-circuit, means controlled by the movement of the drive-shaft for opening said switch at times, electromagnetic devices for closing said switch at times, means for locking said switch to its closed position, and return-signals controlled by the movement of the drive-shaft to indicate the position of the semaphore-signals.

36. In an apparatus of the class described, supporting-standards having bearing portions, a signal-carrying shaft, mounted therein, a semaphore-carrying arm secured to the shaft, a slotted operating-arm secured to the shaft, a rotatable drive-shaft mounted in bearings in said support, a crank-arm connected to said drive-shaft, a wrist-pin on said crank-arm to enter the slot in said operating-arm, an electric motor geared to said drive-shaft to rotate it to operate the signals, and return-signals controlled by the movement of the drive-shaft to indicate the position of the semaphore-signals.

37. In an apparatus of the class described, upright supports having bearing portions, a signal-shaft mounted therein, a semaphore-signal-carrying arm secured to the shaft, a slotted operating-arm secured to the shaft, a pair of supplemental glass-carrying arms secured to the shaft, a signal-light secured between the supports to coöperate with the signal-glasses, a rotatable drive-shaft mounted in bearings in said support, a crank-arm connected to said drive-shaft, a wrist-pin on said crank-arm to enter the slot in said operating-arm, and an electric motor geared to said drive-shaft to rotate it substantially as shown and described.

38. In an apparatus of the class described, upright supports having bearing portions, a signal-shaft mounted therein, a semaphore-signal-carrying arm secured to the shaft, a slotted operating-arm secured to the shaft, a pair of supplemental glass-carrying arms secured to the shaft, a signal-light secured between the supports to coöperate with the signal-glasses, a rotatable drive-shaft mounted in bearings in said support, a crank-arm connected to said drive-shaft, a wrist-pin on said crank-arm to enter the slot in said operating-arm, an electric motor geared to said drive-shaft to rotate it, and return-signals controlled by the movement of the drive-shaft to indicate the position of the semaphore and light signals, substantially as shown and described.

39. In an apparatus of the class described, supporting-standards having bearing portions, a signal-carrying shaft mounted therein, a semaphore-signal-carrying arm secured to the shaft, a slotted operating-arm secured to the shaft, a rotatable drive-shaft mounted in bearings in said support, a crank-arm connected to said drive-shaft, a wrist-pin on said crank-arm to enter the slot, in said operating-arm, an electric motor geared to said drive-shaft to rotate it to operate the signals, return-signals controlled by the movement of the drive-shaft to indicate the position of the semaphore-signals, a motor-circuit, a switch in said motor-circuit, and means controlled by the movement of the drive-shaft for opening said switch at times, substantially as shown and described.

40. In an apparatus of the class described, supporting-standards having bearing portions, a signal-carrying shaft mounted therein, a semaphore-signal-carrying arm secured to the shaft, a slotted operating-arm secured to the shaft, a rotatable drive-shaft mounted in bearings in said support, a crank-arm connected to said drive-shaft, a wrist-pin on said crank-arm to enter the slot, in said operating-arm, an electric motor geared to said drive-shaft to rotate it to operate the signals, return-signals controlled by the movement of the drive-shaft to indicate the position of the semaphore-signals, a motor-circuit, a switch in said motor-circuit, means controlled by the movement of the drive-shaft for opening said switch at times, and electromagnetic devices for closing said switch at times, substantially as shown and described.

41. In an apparatus of the class described, upright supports having bearing portions, a signal-shaft mounted therein, a semaphore-signal-carrying arm secured to the shaft, a slotted operating-arm secured to the shaft, a pair of supplemental glass-carrying arms secured to the shaft, a signal-light secured between the supports to coöperate with the signal-glasses, a rotatable drive-shaft mounted in bearings in said support, a crank-arm connected to said drive-shaft, a wrist-pin on said crank-arm to enter the slot in said operating-arm, an electric motor geared to said drive-shaft to rotate it, a motor-circuit, a switch in said motor-circuit, means for locking said switch to its closed position, and means controlled by the movement of the drive-shaft for unlocking said switch at times, substantially as shown and described.

42. In an apparatus of the class described, upright supports having bearing portions, a signal-shaft mounted therein, a semaphore-signal-carrying arm secured to the shaft, a slotted operating-arm secured to the shaft, a pair of supplemental glass-carrying arms secured to the shaft, a signal-light secured between the supports to coöperate with the signal-glasses, a rotatable drive-shaft mounted in bearings in said support, a crank-arm connected to said drive-shaft, a wrist-pin on said crank-arm to enter the slot in said operating-arm, an electric motor geared to said drive-shaft to rotate it, a motor-circuit, a switch in said motor-circuit, means for locking said switch to its closed position, means controlled by the movement of the drive-shaft for unlocking said switch at times, and return electric signal-circuits including circuit-closing terminals and circuit-closers carried by the drive-shaft for closing said return-signal circuits at times, substantially as shown and described.

43. In an apparatus of the class described, an oscillating signal-shaft, a rotating drive-shaft, connections between said drive-shaft and said signal-shaft whereby the rotary motion of the former is converted into oscillating motion in the latter, a rotatable electric motor, gear connections between said electric motor and said drive-shaft whereby the motor rotates the drive-shaft, an electric-motor circuit, a switch in said electric-motor circuit, means for normally holding said switch closed, means controlled by the drive-shaft movement for releasing said switch to open the motor-circuit at times, a main-line setting-circuit, electromagnetically-operating means in said main-line setting-circuit for closing the motor-circuit at times, substantially as shown and described.

44. In an apparatus of the class described, an oscillating signal-shaft, a rotating drive-shaft, connections between said drive-shaft and said signal-shaft whereby the rotary motion of the former is converted into oscillating motion in the latter, a rotatable electric motor, gear connections between said electric motor and said drive-shaft, whereby the motor rotates the drive-shaft, an electric-motor circuit, a switch in said electric-motor circuit, means for normally holding said switch closed, means controlled by the drive-shaft movement for releasing said switch to open the motor-circuit at times, a main-line setting-circuit, electromagnetically-operating means in said main-line setting-circuit for closing the motor-circuit at times, and a pair of return-signaling circuits, said return-circuits including circuit-closers controlled by the movement of the drive-shaft for closing and opening said return-signal circuits, all being arranged substantially as shown and described.

45. In an apparatus of the class described, an oscillatable semaphore-signal-carrying shaft, a rotatable drive-shaft an electric motor for rotating said drive-shaft, connections between the drive-shaft and the signal-shaft whereby the rotary motion of the former is converted into oscillating motion in the latter, said connections between the drive and signal shafts being so arranged that when the signal-shaft is at the extreme movement of its danger and safety positions the signal-shaft will be locked from independent movement, substantially as shown and described.

46. In an apparatus of the class described, an oscillatable semaphore-signal-carrying shaft, a rotatable drive-shaft, an electric motor for rotating said drive-shaft, connections between the drive-shaft and the signal-shaft whereby the rotary motion of the former is converted into oscillating motion in the latter, said connections between the drive and signal shafts being so arranged that when the signal-shaft is at the extreme movement of its danger and safety positions, the signal-shaft will be locked from independent movement, and a housing for inclosing the operating mechanism, said signal-shaft projecting through said housing, substantially as shown and described.

47. In an apparatus of the class described, a supporting-frame, a signal-shaft carried by the supporting-frame which controls the signal, a rotatable operating-shaft, connections between the operating and signal shafts whereby the rotatable motion of the former is converted into oscillating motion in the latter, an electric motor for rotating the operating-shaft, electrically-controlled means for starting the motor into operation, means for automatically cutting out the motor from operation at times, means for sending in return-signals from the semaphore to the power-operator's station, to indicate the position of the signals, and means whereby the signaling-shaft can be locked from independent movement when in its extreme danger or safety positions substantially as shown and described.

JEAN F. WEBB, Jr.

Witnesses:
 LAFAYETTE F. CRAWFORD,
 JEAN F. WEBB.